(12) United States Patent
Tabor et al.

(10) Patent No.: US 9,466,067 B2
(45) Date of Patent: *Oct. 11, 2016

(54) MOBILE PROMOTION DISTRIBUTION

(75) Inventors: Catherine M. Tabor, Atlanta, GA (US); Ken R. Powell, Watkinsville, GA (US); John W. Daniel, Bogart, GA (US); Terry Bruehl, Atlanta, GA (US)

(73) Assignee: SPARKFLY INC, Atlanta, GA (US)

( * ) Notice: Subject to any disclaimer, the term of this patent is extended or adjusted under 35 U.S.C. 154(b) by 1276 days.

This patent is subject to a terminal disclaimer.

(21) Appl. No.: 13/276,001

(22) Filed: Oct. 18, 2011

(65) Prior Publication Data

US 2013/0096996 A1 Apr. 18, 2013

(51) Int. Cl.
*G06Q 30/00* (2012.01)
*G06Q 30/02* (2012.01)

(52) U.S. Cl.
CPC .................. *G06Q 30/0207* (2013.01)

(58) Field of Classification Search
CPC .......... G06Q 30/251; G06Q 30/0209
USPC ........................................... 705/14
See application file for complete search history.

(56) References Cited

U.S. PATENT DOCUMENTS

| | | | |
|---|---|---|---|
| 2006/0252525 A1* | 11/2006 | Walker et al. | 463/29 |
| 2007/0202900 A1* | 8/2007 | Inselberg | 455/500 |
| 2007/0212015 A1* | 9/2007 | Green | G11B 20/00086 386/239 |
| 2008/0163055 A1* | 7/2008 | Ganz | G06Q 30/0643 715/706 |
| 2008/0227467 A1* | 9/2008 | Barnes et al. | 455/456.2 |
| 2011/0015984 A1* | 1/2011 | Galinos | 705/14.26 |
| 2011/0269436 A1* | 11/2011 | Porco | 455/414.1 |
| 2012/0252558 A1* | 10/2012 | Mishra | A63F 13/798 463/25 |

* cited by examiner

Primary Examiner — Matthew L Hamilton

(57) ABSTRACT

Systems and methods for providing games, challenges, and/or promotions to mobile devices are usable to provide incentives to customers. According to one embodiment, a system can be provided. The system can be operable to receive location information associated with a mobile device and additional information, such as but not limited demographic and/or purchase history information, associated with the mobile device. Additionally, the system can be operable to select content based on the received information, transmit the content to the mobile device, receive an event outcome indicator associated with the content, and provide a promotional offer to the mobile device.

11 Claims, 5 Drawing Sheets

MOBILE PROMOTION DISTRIBUTION

BACKGROUND

In both traditional brick-and-mortar stores and e-commerce sites, merchants often provide promotions to incentivize customers to purchase goods and/or services. For instance, a merchant may provide a coupon to a potential customer in the hopes that the potential customer will eventually make a purchase. If the customer is pleased with the purchase they may return for subsequent purchases.

However, while these situations illustrate instances where a promotion may entice a customer to purchase goods and/or services, in many instances the customer may not receive appropriate promotions. Additionally, modern mobile device user's are often flooded with promotions for products or services with which they have no interest. As such, finding ways to appropriately provide relevant promotional content continues to be a priority.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

Figure 1:
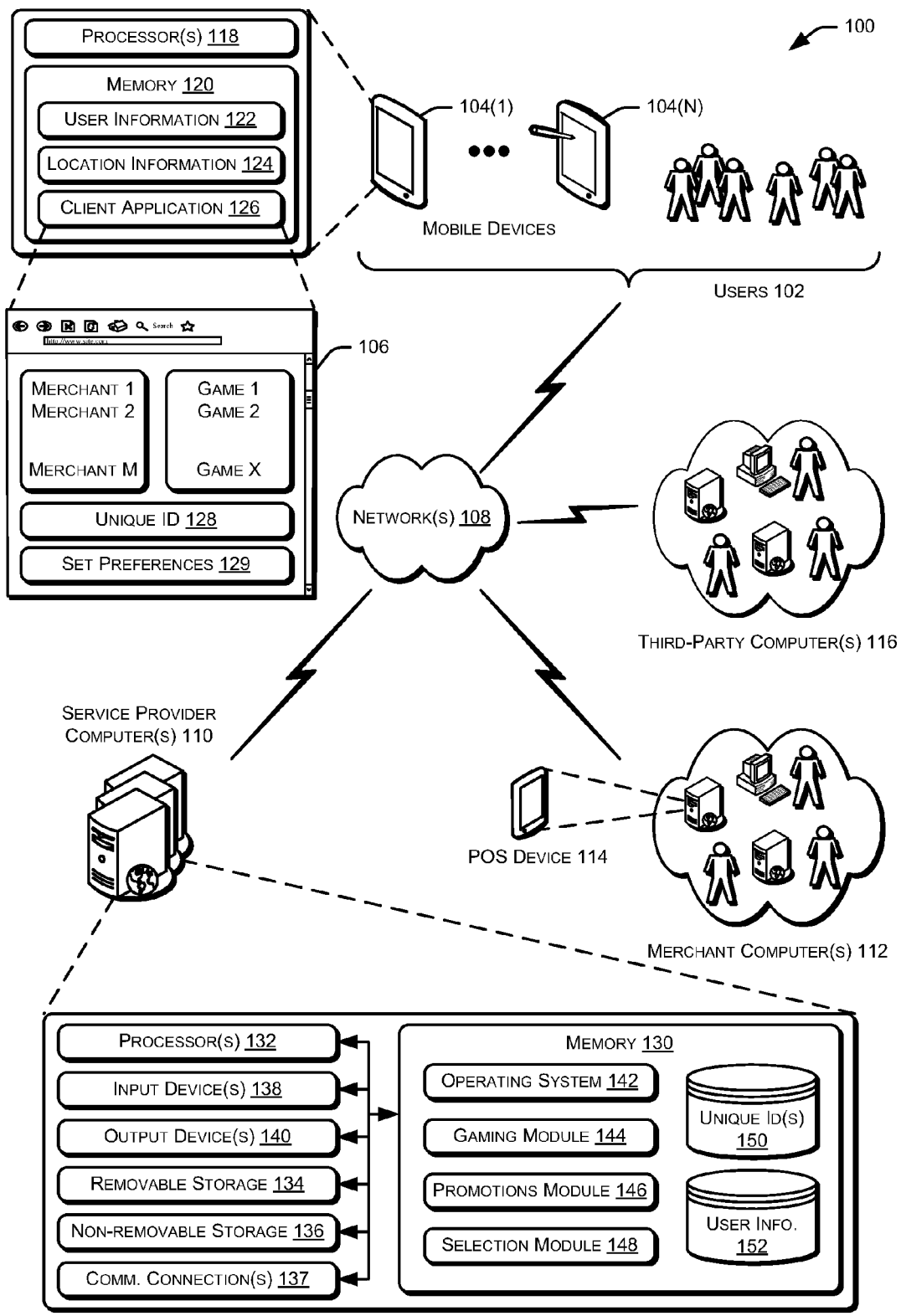
FIG. 1 illustrates an example architecture for providing games, challenges, and/or promotional content associated with a merchant to a mobile device, according to an example implementation.

Embodiments of the present disclosure are directed to, among other things, providing games and promotional content to mobile devices, including near-field communication (NFC) devices. As an overview, content may be a game, a challenge, a question, a promotion, a coupon, a coupon code, a unique identifier, a product, a service, a sellable unit, a user profile, location information, or anything else that can be transmitted to a mobile device or other computing device. An on-line (or brick-and-mortar) merchant or a third-party vendor (e.g., a consumer goods manufacturer or other consumer packaged goods (CPG) provider) may provide games and/or challenges for mobile devices and their users (i.e., the consumer). One or more games and/or challenges may then be selected for presentation to appropriate users based on several factors. For example, appropriate games and/or challenges may be selected for a particular consumer based on the location of the consumer's mobile device, the location of a merchant, past purchasing behavior of the consumer, and/or demographic information associated with the consumer.

In some examples, once a condition is satisfied regarding the game and/or challenge (e.g., a challenge question is answered correctly or a game is won), promotional content may be provided to the consumer. In some aspects, promotional content may include a coupon or other discount for use at a merchant's or third-party vendor's establishment or website. Additionally, in some aspects, the promotional content may include a unique identifier for indicating to the merchant that the consumer earned a coupon or discount. Similarly, or alternatively, in some examples, promotional content may be selected for presentation to a consumer based on the location information and other user information (e.g., purchase history information and/or demographic information) without first providing the game and/or challenge.

In some instances, a service provider may receive, store, and/or manage games, challenges, and/or promotional content provided by merchants and/or third-party vendors. By way of example only, a merchant may include a restaurant, a convenience store, a supermarket, a retail store, a doctor or other service provider, an on-line store, a mechanic, a wholesaler, or any other type of business that provides goods and/or services to consumers. Similarly, a third-party vendor may include any of the above types of merchants and/or providers of products and/or services that are sold at, but are not necessarily directly associated with, the merchant. For example, a provider of a brand of soda sold exclusively or otherwise at a restaurant may be a third-party vendor.

In some examples, the service provider may receive location and/or user information associated with a mobile device. Location information may include global positioning service (GPS) information transmitted from the mobile device, location information entered by a user of the mobile device, and/or location information determined based on a location of a cellular tower or Wi-Fi™ device through which the mobile device is communicating. Further, user information associated with the mobile device may include purchase behavior information (e.g., products and/or services, types of products and/or services, amounts of products and/or services, values of products and/or services, and/or frequency of purchase of products and/or services purchased by a consumer using the mobile device or at least associated with the mobile device) and/or demographic information (e.g., a name, address, average income, sex, and/or race associated with a consumer).

Additionally, the service provider may receive games and/or challenges intended for particular mobile devices (e.g., devices belonging to members of certain demographics and/or groups). Alternatively, or in addition, the games and/or challenges may be intended for devices that are located in certain geographic locations. For example, a retail store (or chain of retail stores) may provide a game and/or challenge to the service provider that is intended for mobile devices within a predefined distance from the physical location of the retail store (or one of the chain of retail stores). In this way, particular mobile devices may be targeted when the service provider receives information indicating that a mobile device is within the range (e.g., within a mile of the location, within five miles of the location, within the same city or county as the location, or traveling towards the location from any distance). Further, on some examples, particular mobile devices may be targeted based on a combination of the physical location of the mobile device and the demographic and/or user information.

In some instances, a consumer may control a mobile device and activate an application or other software program for receiving promotions, playing games, and/or completing challenges. The application or software program may display the promotions, games, and/or challenges that were received from the service provider. In some examples, the consumer may be presented with one or more promotions, games, and/or challenges provided by the service provider. For example, the service provider may determine an appropriate list or set of promotions, games, and/or challenges for the consumer based on the physical location of the consumer or the mobile device of the consumer or based on the user information associated with the consumer or the mobile device of the consumer (such as purchase behavior history and/or demographic information). This appropriate list, set, or other grouping of determined promotions, games, and/or challenges may be transmitted to the mobile device, and/or retrieved from memory of the mobile device in whole or in part, for presentation. Alternatively, or in addition, the service provider may transmit information related to one or more merchants that the service provider determines is appropriate based on the location information, the user information, or a combination. In this example, the consumer may select a merchant, rather than a game and/or challenge, and the game and/or challenge associated with the selected merchant may then be presented.

In some aspects, games and/or challenges may be interactive and/or graphical video-type games, such as but not limited to first-person shooter games, adventure games, role-playing games, and the like. However, games and/or challenges may also include trivia questions, word scrambles, scavenger hunts, and the like. In one non-limiting example, a game and/or challenge may request a consumer to identify the third wine on a wine list of a particular restaurant or a manager's name. In another non-limiting example, a game and/or challenge may require the consumer to frequent a location or locations or purchase items and services from a number of different merchants in order to complete the game and/or challenge. Other examples may include collecting items from merchant's stores or answering historical trivia questions about the merchant, a third-party vendor, or other entities, locations, or events.

In certain examples, once a consumer has successfully completed a game and/or challenge, the mobile device or merchant (e.g., a batch or real-time delivery of consumer information/ID) may transmit an outcome event indication or response to the service provider. The service provider may be configured to determine whether the game and/or challenge was completed correctly (or at least to the satisfaction of the merchant and/or third-party vendor), whether the mobile device is registered with the service provider, and/or whether the game and/or challenge is still valid. In some instances, the service provider may provide a unique identifier to the mobile device. This unique identifier may be presented to the merchant to indicate that the consumer has earned a promotion, coupon, and/or discount. Upon verification of the unique identifier, either locally or with the service provider, the merchant may then discount the price of a specific item or group of items or the total sales price for items purchased and/or services provided for the consumer.

In some examples, a point of sale (POS) device located at the merchant may be integrated with software for performing the disclosed features and may be communicatively coupled to a computer of the service provider such that these features may be performed automatically, seamlessly, and/or in real-time. The POS system may receive the unique identifier by the merchant or consumer with a card scan or swipe, barcode scan from the mobile device display, keypad entry, touch screen for input, mouse input, the transmission of a signal from the mobile device via NFC, or capturing other biometric input from the consumer such as fingerprint, voice, eye, or facial features. As such, the POS device may receive the unique identifier, verify with the service provider (or against identifiers stored locally), and provide the discount to a pending transaction in real-time or near real-time. Additionally, in some examples, the POS device or the merchant may record or otherwise maintain a list of consumers that have successfully completed the challenge and/or game. In this example, the POS device or the merchant may periodically (or in real-time) transmit unique identifiers and/or the list of consumers that have completed tasks to the service provider.

Additionally, in some instances, the service provider may receive and record an indication that a consumer and/or mobile device has redeemed a promotion with a particular merchant and may allow the consumer to interact with (e.g., by "unlocking") the next game and/or challenge associated with that particular merchant. In this way, the consumer may be incentivized to return to that particular merchant creating repeat business for the merchant and/or third-party vendor. As used herein, "unlocking" refers to providing games and/or challenges to users that were previously "locked" or otherwise unavailable. That is, a "locked" game or challenge may be visible to a user in that it may be selectable or viewable; however, the user may not be able to participate and/or complete the game and/or challenge. In some aspects, the "locked" games and/or challenges provide greater rewards than the "unlocked" ones, thus encouraging users to complete games and/or challenges to further "unlock" additional games and/or challenges. This may also promote repeat customers.

For example, upon selecting a merchant for the first time, a first game and/or challenge may be automatically "unlocked" such that the user may be able to select, interact with, and/or play/complete the game and/or challenge. In some instances, this may be considered the first level. As games are completed, and new games are "unlocked," the user may progress to higher levels. In some aspects, advancing to the next level may include the possibility of increased rewards. That is, in some examples, the next level may provide a greater discount or a more valuable reward (or at least the opportunity for a greater discount or more valuable reward) than the last level.

Further, social networking may be utilized to allow users to interact with other social network members to promote the service provider and/or the promotions platform. For example, promoting the promotions platform and/or recruiting new members via a social networking site may lead to increased discounts for the user who initiates the promotion and/or the recruitment.

The following discussion begins with a section entitled "Illustrative Architecture," which describes a non-limiting environment in which a service provider may interact with one or more mobile devices, one or more merchants, and/or one or more third-party vendors for providing games, challenges, and/or promotions to users and/or mobile devices. The discussion then concludes with a section entitled "Illustrative Processes" and a brief conclusion.

This brief introduction, including section titles and corresponding summaries, is provided for the reader's convenience and is not intended to limit the scope of the claims, nor the proceeding sections. Furthermore, the techniques described above and below may be implemented in a number of ways and in a number of contexts. Several example implementations and contexts are provided with reference to the following figures, as described below in more detail. However, the following implementations and contexts are but a few of many.

Illustrative Architecture

FIG. 1 depicts an illustrative architecture 100 in which techniques for providing games, challenges, and/or promotions to mobile devices may be implemented. In architecture 100, one or more users 102 may utilize mobile computing devices (or NFC devices) 104(1), . . . , 104(N) to access a client application interface (or website) 106 that may be provided by, created by, or otherwise associated with a service provider via one or more networks 108. In some instances, the mobile computing devices (collectively 104) may be configured to present or otherwise display the client application interface 106 to one or more users 102. The networks 108 may include any one or a combination of multiple different types of networks, such as cable networks, the Internet, wireless networks, and other private and/or public networks. While the illustrated example represents users 102 accessing the client application interface 106 over the networks 108, the described techniques may equally apply in instances where the users 102 interact with a service provider via a personal computer, over the phone, via a kiosk, or in any other manner. It is also noted that the described techniques may apply in other client/server arrangements (e.g., set top boxes, etc.), as well as in non-client/server arrangements (e.g., locally-stored software applications, etc.).

In some aspects, and as described briefly above, the client application interface 106 may allow the users 102 to access, receive from, transmit to, or otherwise interact with a service provider via one or more service provider computers 110. In some examples, the client application interface 106 may also allow users to receive games, challenges, and/or promotions from the service provider computers 110 over the networks 108. Through the client application interface 106, the users 102 may play games, complete challenges, answer trivia questions, and/or receive information.

The architecture 100 may also include one or more merchant computing devices 112. The merchant computing devices 112 may be any type of computing devices, such as but not limited to, mobile, desktop, and/or cloud computing devices, such as servers. In some examples, the merchant computers 112 may be in communication with the service provider computer 110 via the networks 108, or via other network connections. The merchant computers 112 may include one or more servers, perhaps arranged in a cluster, as a server farm, or as individual servers not associated with one another. These servers may be configured to host a website viewable via the client application interface 106 or any other Web browser accessible by a user 102, such as but not limited to one or more of the mobile devices 104. Additionally, in some aspects, the merchant computers 112 may be configured to create and/or provide games and/or challenges for the mobile devices 104.

In some embodiments, a merchant computer 112 may be coupled with, or integrated within, a POS device 114 for completing transactions with customers or users 102. The POS device 114 may be configured to process purchase transactions of a user 102 either at a brick-and-mortar location or accessible via the Internet and may include, but are not limited to, handheld POS devices, desktop-style, kiosk-style, and/or register-style POS devices. In some aspects, the features of the service provider computer 110 may be integrated within the POS device 114 such that the POS device may be able to read, identify, or otherwise receive input regarding a completed challenge and/or won game on a mobile device 104.

The architecture 100 may also include one or more third-party computing devices 116. The third-party computing devices 116 may also be any type of computing devices, such as but not limited to, mobile, desktop, and/or cloud computing devices, such as servers. In some examples, the third-party computers 116 may be in communication with the service provider computer 110 via the networks 108, or via other network connections. The third-party computers 116 may include one or more servers, perhaps arranged in a cluster, as a server farm, or as individual servers not associated with one another. These servers may be configured to host a website viewable via the client application interface 106 or any other Web browser accessible by a user 102, such as but not limited to one or more of the mobile devices 104. Additionally, in some aspects, the third-party computers 116 may be configured to create and/or provide games and/or challenges for the mobile devices 104.

In some aspects, the third-party computers 116 may be configured to receive, store, manage, distribute, analyze, and/or determine user information associated with users 102. For example, a third-party computer 116 may be configured to receive purchase history information associated with a user 102 or a mobile device 104. Additionally, a different (or the same) third-party computer 116 may be configured to receive demographic information associated with a user 102 and/or a mobile device 104. In some examples, a user 102 may be able to update or otherwise change their own demographic information received by, and/or stored at, the third-party computers 116. In some instances, the third-party computers 116 may create categories, levels, or other groupings of user 102 based on the received user information. The service provider computers 110 may then select appropriate promotions, games, and/or challenges to be sent to the mobile devices 104 based on this information.

The mobile devices 104 may be any type of computing devices, including but not limited to mobile phones, personal digital assistants (PDAs), tablets personal computers (PCs), game consoles, set-top boxes, and the like. In some instances and as illustrated, each user computing device 104 may be equipped with one or more processors 118 and memory 120 to store applications and data, such as user information 122, location information 124, and a client application 126 that displays the client application interface 106 and/or enables access to the Web site 106 stored on the service provider computers 110 or elsewhere.

The user information 122 may be personal information associated with the user 102 of the computing device 104. For example, the user information 122 may include general demographic information such as name, age, address, and salary range and/or enhanced demographic information such as sex, race, telephone number, height, weight, etc. of the user 102. This user information 122 may be provided by the user 102 or may be aggregated by the service provider computer 110, the third-party computers 116, or some other service, and transmitted to the mobile device 104. The location information 124 may be based on the physical location of the mobile device 104. This location information 124 may be provided by, or otherwise determined by, GPS, triangulation, Internet protocol (IP) address, router location, or any other methods for determining a location of a mobile device 104.

Additionally, the user information 122 may include purchase behavior information based on purchased items or services, amounts of purchased items or services, dollar amounts spent on purchased items or services, etc. For example, a purchase history may include information associated with some or all products purchased by a consumer using a mobile device or associated with the mobile device. That is, if a consumer associated with a mobile device purchases a new pair of shoes, a used vehicles, and a three dinners in a predetermined time period, such as a week or a month, the purchase behavior information may indicate each of the items, the amount spent on each item, the dates and/or times of day associated with each purchase, and/or aggregates of each or all of the purchases. In this way, purchasing behavior profiles, groups, labels, levels, etc., may be designated for the users 102 such that, appropriate promotions, games, and/or challenges may be targeted towards these users 102.

In some aspects, the client application interface 106 may provide a list of merchants determined to be within a predetermined distance of the mobile device 104 or related to (or associated with) a particular demographic or purchasing behavior, such as Merchants 1, 2, . . . , M. For example, the Merchants 1-M may be merchants determined to be within one mile, or some other distance, of the mobile device 104 or they may be merchants associated with games selected by the user 102. In other examples, however, Merchants 1-M may be merchants that match the user's 102 demographic and/or purchase behavior. For example, if a purchase behavior of a particular user 102 indicates that they purchase new shoes often, the Merchants 1-M may be shoe-store merchants when the mobile device 104 is near a shoe merchant or independent of the location of the mobile device. Similarly, if the user's purchase behavior also indicates that the user 102 eats lunch around noon every day, Merchants 1-M may be restaurants during or right before noon and shoe-store merchants at other times of the day. As desired, other combinations of purchasing behavior information may be used to determine what list of Merchants 1-M to be displayed at the client application interface 106.

Alternatively, or in addition, the client application interface 106 may provide a list of available games and/or challenges associated with merchants within a predetermined distance of the mobile device 104 and/or associated with information about the user 102 (such as demographic information and/or purchase history) of the computing device 104, such as Games 1, 2, . . . , X. For example, the Games 1-X may be games available, or provided by, merchants within the predetermined distance, or they may be games associated with, or otherwise provided by, merchants selected by the user 102 regardless of location. Further, Games 1-X may be associated with or otherwise related to merchants that match the user's 102 demographic information or profile and/or purchasing behavior information or profile. Additionally, once a user 102 has selected a promotion or correctly completed and/or answered a game and/or challenge, the client application interface 106 may be configured to display a unique identifier (ID) 128.

As noted above, in some aspects, promotions, games, and/or challenges transmitted to the mobile devices 104 may be provided by the merchant computers 112 and/or the third-party computers 116. In one example embodiment, a first merchant computer, for example Merchant 1, may be a computing device controlled by a restaurant owner, manager, or employee and may transmit a game or challenge, for example Game 1, to the service provider computer 110. Similarly, Merchant 2, possibly a different restaurant, may provide and/or transmit a different game, for example, Game 3, to the service provider. In this example, the respective games and/or challenges may be 1) a request for a user 102 to learn the first restaurant manager's name and 2) a request for a user 102 to learn the fifth wine on the wine list of the second restaurant. In some aspects of this example, the user 102 may select the first game based on personal preference even if it is not geographically close to the user 102. The user 102 may then go to the first restaurant, ask for the manager's name, and enter the answer, or select from a list (e.g., in a multiple-choice question format), into the client application interface 106. An event outcome indicator may then be transmitted to the service provider computer 110 indicating that the user 102 is attempting to complete the challenge. Alternatively, the answer, and thus, the event outcome indicator, could be entered via a Web interface.

Upon transmitting the event outcome indicator to the service provider computer, the mobile device 104 may also transmit location information. In some aspects, the service provider computer 110 may validate the answer in the event outcome indicator by comparing it to the answer provided by the merchant computer 112. The service provider computer 110 may also, optionally, verify that the user 102 is actually at the location of the first restaurant if that is part of the challenge provided by the merchant computer 112. Alternatively, however, the validation and/or storage of the answer may take place on the mobile device 102 without any transmission to the service provider computer 110, for example in instances when there are bandwidth and/or connectivity issues or, optionally, it is not required by the provider of the promotion. In some examples, the service provider computer 110 may also verify that the user 102 is a registered user, that the game and/or challenge is still a valid game and/or challenge, and/or that the game and/or challenge was appropriately "unlocked" by the user 102 prior to completion.

In some aspects, once the service provider computer 110 determines that the event outcome indicator indicates a completed challenge, and other validations/verifications are complete, the unique ID 128 may be transmitted to the mobile device 104. The unique ID 128 may, in some instances, be unique for each transaction, game, challenge, user 102, and/or merchant. The unique ID 128 may then be presented to the merchant at the physical location, whereby the merchant or consumer performs one of the following to transmit unique ID 128 to the merchant computer 112 or POS device 114: card scan or swipe, barcode scan from the mobile device display, keypad entry, touch screen for input, mouse input, the transmission of a signal from the mobile device via NFC, or capturing other biometric input from the consumer such as fingerprint, voice, eye, or facial features. Unique ID 128 may then be transmitted from the POS device 114 or the merchant computer 112 to the service provider computer 110, and validated by the service provider computer 110. If validated, the service provider computer 110 may then indicate that the merchant should provide the associated promotion to the user 102, for example, because the user 102 has won the game and/or completed the challenge. Once completed, the next game and/or challenge may be "unlocked" for the user 104. In some instances, the discounts and/or promotions may become increasingly valuable as the user 102 "unlocks" additional games and/or challenges.

In another example embodiment, promotions, games, and/or promotions may be provided by third-party vendors or merchants, controlling third-party computers 116. For example, a third-party vendor may include a seller of a product that is sold at a merchant's store. In this embodiment, a third-party vendor may provide a game that requests a user 102 to complete one or more challenges related to the merchant store where the third-party vendor's product is sold or related to the third-party product. In one example, the third-party vendor may be a soda vendor and the game and/or challenge may be to purchase the third-party vendor's soda at a certain number of participating merchant stores. As such, the event outcome indicator may indicate to the service provider computer 110 that the user 102 has purchased the third-party vendor's soda at three participating stores. If this completes the challenge, the unique ID 128 may be provided to the mobile device 104 and the user 102 may be able to redeem for a promotion related to either one of the participating stores, another merchant, or the third-party vendor.

In some aspects, one or more servers, perhaps arranged in a cluster or as a server farm, may host the service provider 110. Other server architectures may also be used to host the service provider 110. The service provider computers 110 are capable of handling requests from many users 102 and serving, in response, various games, challenges, promotions, unique identifiers, and/or user interfaces that can be rendered at user computing devices 104(1)-(N).

In one illustrative configuration, the service provider computer 110 comprises at least a memory 130 and one or more processing units (or processor(s)) 132. The processor(s) 132 may be implemented as appropriate in hardware, software, firmware, or combinations thereof. Software or firmware implementations of the processor(s) 132 may include computer-executable or machine-executable instructions written in any suitable programming language to perform the various functions described.

Memory 130 may store program instructions that are loadable and executable on the processor(s) 132, as well as data generated during the execution of these programs. Depending on the configuration and type of service provider computer 110, memory 130 may be volatile (such as random access memory (RAM)) and/or non-volatile (such as read-only memory (ROM), flash memory, etc.). The service provider computer 110 or server may also include additional removable storage 134 and/or non-removable storage 136 including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 130 may include multiple different types of memory, such as static random access memory (SRAM), dynamic random access memory (DRAM), or ROM.

The memory 130, the removable storage 134, and the non-removable storage 136 are all examples of computer-readable storage media. For example, computer-readable storage media may include volatile and non-volatile, removable and non-removable media implemented in any method or technology for storage of information such as computer-readable instructions, data structures, program modules or other data. Memory 130, removable storage 134, and non-removable storage 136 are all examples of computer storage media. Additional types of computer storage media that may be present include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile discs (DVD) or other optical storage, magnetic cassettes, magnetic tape, magnetic disk storage or other magnetic storage devices, or any other medium which can be used to store the desired information and which can be accessed by the service provider computer 110 or other computing device. Combinations of any of the above should also be included within the scope of computer-readable media.

Alternatively, computer-readable communication media may include computer-readable instructions, program modules, or other data transmitted within a data signal, such as a carrier wave, or other transmission. However, as used herein, computer-readable storage media does not include computer-readable communication media.

The service provider computer 110 may also contain communications connection(s) 137 that allow the service provider computer 110 to communicate with a stored database, another computing device or server, user terminals, and/or other devices on a network. The service provider computer 110 may also include input device(s) 138 such as a keyboard, mouse, pen, voice input device, touch input device, etc., and output device(s) 140, such as a display, speakers, printer, etc.

Turning to the contents of the memory 130 in more detail, the memory 130 may include an operating system 142 and one or more application programs or services for implementing the features disclosed herein including a gaming module 144, a promotions module 146, a selection module 148, a unique ID datastore 150, and/or a user information datastore 152. The gaming module 144 may be configured to receive, store, create, and/or determine outcomes of games and/or challenges provided by merchant computers 112. Additionally, the promotions module 146 may be configured to receive, store, create, determine, and/or manage promotions of the merchants and/or third party vendors.

In some aspects, the selection module 148 may be configured to select promotions, games, and/or challenges for presentation or transmittal to the mobile devices 104. In certain examples, the selection may be based at least in part on user information such as, but not limited to, a location of the mobile device 104, a location of a merchant or merchant computer 112, demographic information (e.g., age, address, salary range, etc.), enhanced demographic information (e.g., including additional information provided by the user 102 or gathered by a third-party, such as using third-party computer 116), and/or purchase behavior of the user 102. In some examples, the selection module 148 may be configured to determine a promotion, or list of promotions, to be transmitted to the a user device 104. Similarly, a list of merchants and/or games/challenges may be selected based on the user information.

By way of example only, a user 102 may have recently purchased a certain number, say four or five, products in the last month. As such, the purchasing history information may indicate that this user 102 has spent a certain amount of money on a first type of product (e.g., clothing) and a certain amount of money on a second type of product (e.g., computing devices). In this example, the selection module 148 may then determine that the second type of product cost more money and select a promotion, a game, and/or a challenge associated with or related to computing devices. Additionally, the selection module 148 may use the location information 124 to aid in the selection. That is, promotions, games, and/or challenges related to computing devices that are closer to, or within a predefined distance from, the mobile device 104 may be selected. The promotions, games, and/or challenges may then be transmitted to the mobile device 104.

In some examples, the unique ID datastore 150 may be configured to maintain, or otherwise store, the unique IDs that may be used for validating and/or verifying redemption of a promotion. Additionally, the user information datastore 152 may be configured to maintain, or otherwise store, the user information such as, but not limited to, the location of the mobile device 104, the location of a merchant or merchant computer 112, demographic information (e.g., age, address, salary range, etc.), enhanced demographic information (e.g., including additional information provided by the user 102 or gathered by a third-party, such as using third-party computer 116), and/or purchase behavior of the user 102.

Figure 2:
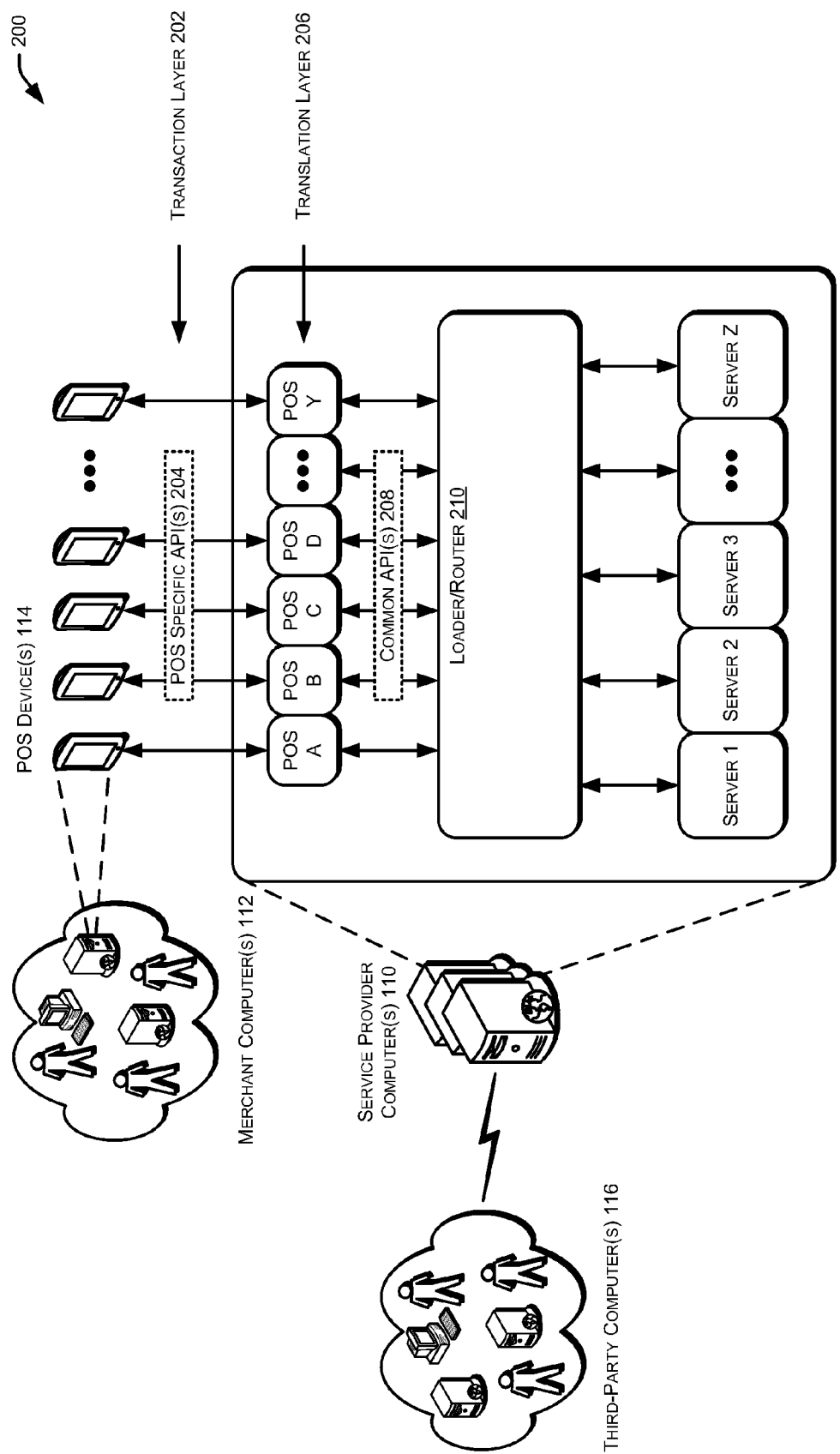
FIG. 2 illustrates an example architecture for communication between a third-party or merchant point of sale (POS) device and a service provider computer for providing games, challenges, and/or promotional content associated with the merchant to a mobile device, according to an example implementation.

FIG. 2 depicts an illustrative architecture 200 in which additional techniques for providing games, challenges, and/or promotions to mobile devices may be implemented. In architecture 200, the service provider computer 110 is again shown in communication with merchant computers 112 and/or third-party computers 116 via one or more networks such as networks 108. Similarly, in some instances, the merchant computers 112 may be communicatively coupled to one or more POS devices 114 for processing purchase transactions with the users 102. POS devices 114 may also be configured to communicate directly with the service provider computers 110 to facilitate the providing, managing, and/or processing of the games, challenges, and/or promotions.

In one embodiment, the service provider computer 110 may expose, or otherwise provide, an application programming interface (API) or multiple APIs for communicating with the POS devices 114, the merchant computers 112, and/or the third-party computers 116. More specifically, at a transaction layer 202, the service provider computers 110 may provide POS specific APIs 204 to each, or some, of the POS devices 114 associated with each, or some, of the merchant computers 112. For example, a first merchant may utilize a different type of POS device 114 than a second merchant (e.g., the different POS devices 114 may be made by different manufacturers, using different standards, and/or operating with different operating systems or with different architectures). In this example, the transaction layer 202 is configured to handle each transaction between the POS devices 114 and the service provider computers 110.

In any event, each POS device 114 may communicate with the service provider computers 110 using different POS specific APIs 204. As such, at a translation layer 206, each POS specific API 204 may be converted (or translated) into a common API 208 for communication with the loader/router 210 of the service provider computers 110. In some aspects, the loader/router 210 may be configured to recognize each POS device communication, for example shown as POS A, B, C, D, . . . , Y, appropriately translate each POS specific API 204 to the common API 208, and further route the common API instructions to the appropriate server, for example, Servers 1, 2, 3, . . . , Z.

Instructions, data, unique IDs 128, games, challenges, promotions, and/or any other information to be transmitted to the POS devices 114, mobile devices 104, merchant computers 112, and/or third-party computers 116 may then be sent from the appropriate server 1-Z to the loader/router 210. Based on the common APIs 208, this information may then be sent back to the translation layer 206 for translation back to the POS specific API 204 instructions. Alternatively, or in addition, third party computers 116, POS devices 114, and/or merchant computers 112 may communicate directly with the service provider computers 110 using a standard API. In this example, the translation layer 206, as well as the POS specific APIs 204 may not be utilized.

Figure 3:
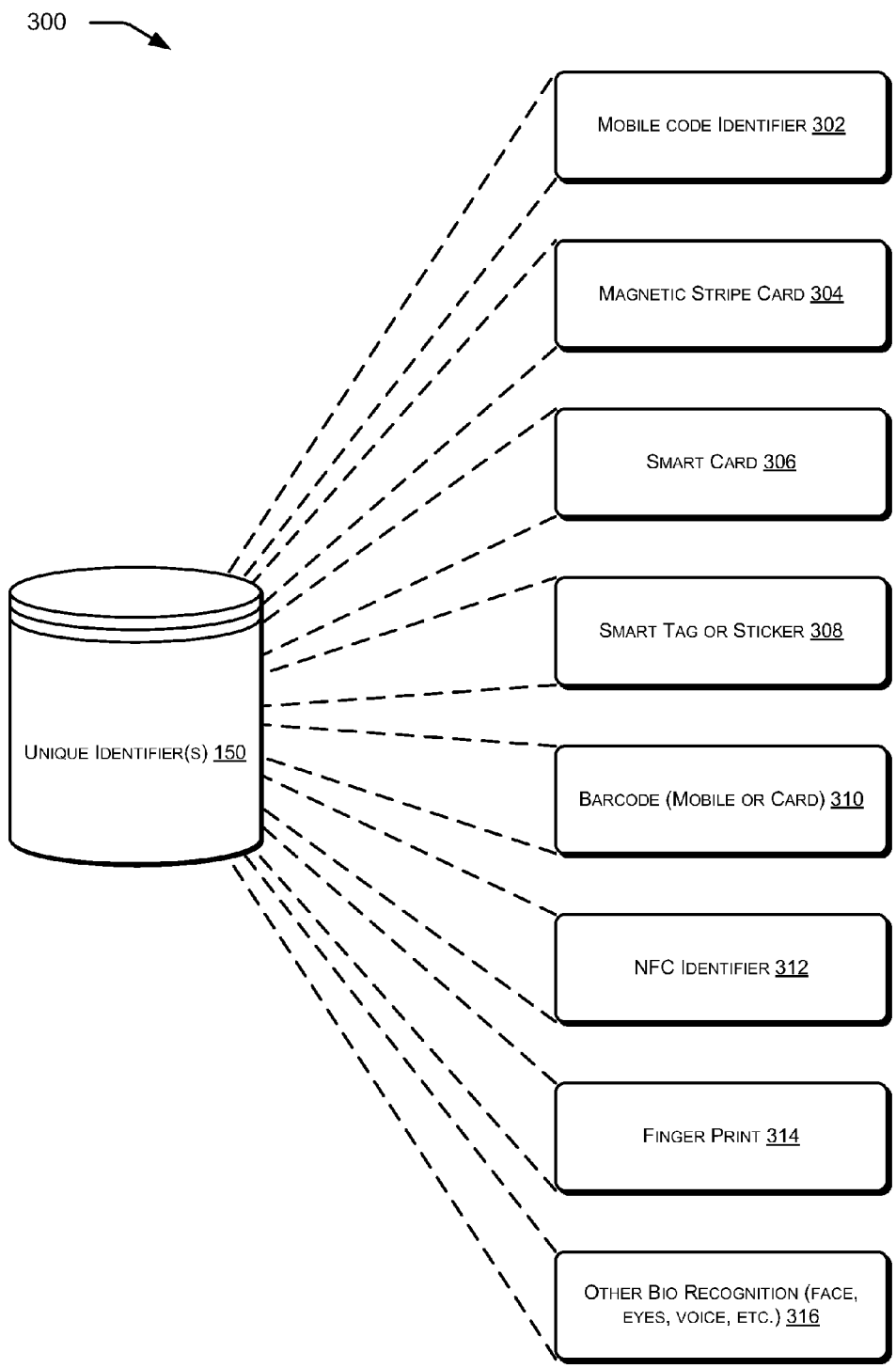
FIGS. 3 and 4 illustrate memory storage devices for storing one or more unique identifiers and user information, respectively, for use in some examples, with the architectures of FIGS. 1 and/or 2, according to an example implementation.

In architecture 200, the service provider computer 110 is again shown in communication with merchant computers 112 and/or third-party computers 116 via one or more networks such as networks 108. Similarly, in some instances, the merchant computers 112 may be communicatively coupled to one or more POS devices 114 for processing purchase transactions with the users 102. POS devices 114 may also be configured to communicate directly with the service provider computers 110 to facilitate the providing, managing, and/or processing of the games, challenges, and/or promotions FIG. 3 depicts an illustrative unique ID datastore 150 in which additional techniques for providing games, challenges, and/or promotions to mobile devices may be implemented. As shown in FIG. 3, several different types of unique IDs may be stored, managed, and/or provided by the unique ID datastore 150. By way of example only, types of unique IDs may include mobile code identifiers 302, magnetic stripe cards 304, smart cards 306, and/or smart tags or stickers 308. Additionally, other types of unique IDs may include barcodes (either mobile barcodes or card barcodes) 310, NFC identifiers 312, finger print identifiers 314, and/or other bio-recognition identifiers 316, such as but not limited to face-recognition, eye-recognition, voice-recognition, etc.

In some examples, and when appropriate, the unique ID may be provided to the mobile device 104 of the user 102 to be presented to the merchant. For example, a mobile code identifier 302, a smart tag or sticker 308, a mobile barcode 310, and/or an NFC identifier 312, among others, may be easily transmitted to, and stored thereon, the appropriate mobile device 104. In other examples, however, the unique ID may be presented to the user 102 in ways other than electronically via the mobile device 104. However, the unique ID itself may be stored in a unique ID datastore 150. Further, the unique ID datastore 150 may be located in the memory 130 of the service provider computer 110, the memory 120 of a mobile device 104, and/or a memory of the merchant computers 112, POS devices 114, and/or third-party computers 116.

Various instructions, methods and techniques described herein may be considered in the general context of computer-executable instructions, such as program modules, executed by one or more computers or other devices. Generally, program modules include routines, programs, objects, components, data structures, etc. for performing particular tasks or implementing particular abstract data types. These program modules and the like may be executed as native code or may be downloaded and executed, such as in a virtual machine or other just-in-time compilation execution environment. Typically, the functionality of the program modules may be combined or distributed as desired in various embodiments. An implementation of these modules and techniques may be stored on some form of computer-readable storage media.

Figure 4:
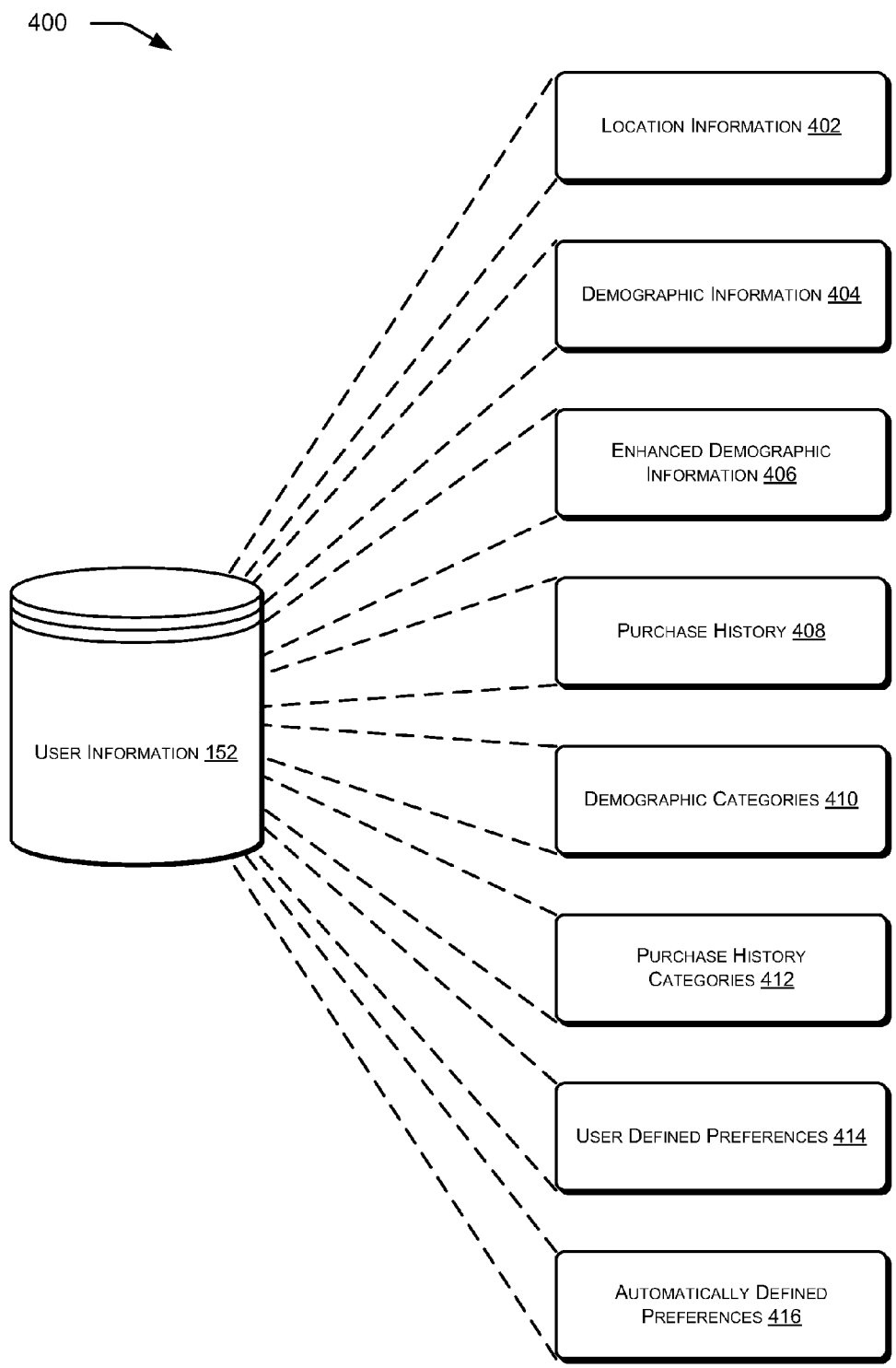

FIG. 4 depicts an illustrative user information datastore 152 in which additional techniques for providing games, challenges, and/or promotions to mobile devices may be implemented. As shown in FIG. 4, several different types of user information may be stored, managed, and/or provided by the user information datastore 152. By way of example only, types of user information may include location information 402, demographic information 404 (including, but not limited to, demographic information collected from public records or other sources), enhanced demographic information 406 (including, but not limited to, additional demographic information provided by the user), and/or purchase history 408. Additionally, other types of user information may include demographic categories 410, purchase history categories 412, user defined preferences 414, and/or automatically defined preferences.

In some examples, demographic categories 410 and/or purchase history categories 412 may be predefined by an operator of the service provider computer 110 or dynamically determined based on demographic and/or purchase history information maintained in the user information datastore 152. In some examples, demographic categories 410 may be based on salary ranges, predetermined classes (e.g., middle class, upper-middle class, etc.), and/or marital status, while purchase history categories 412 may be based on general types of products (e.g., automotive, clothing, computing, home, office, etc.), products actually purchased by the users 102, and/or other user information. Additionally, in some instances, a user 102 may define or set user preferences based on personal desires. As such, a user 102 may set their user preferences such that they receive more promotions, games, and/or challenges related to certain type of products and/or services (e.g., a user 102 may prefer restaurant content, sporting event content, clothing content, or the like). Alternatively, preferences may be defined automatically by the service provider computer based at least in part on the user information, location information, and/or other available information associated with a user 102 or a mobile device 104.

Various instructions, methods and techniques described herein may be considered in the general context of computer-executable instructions, such as program modules, executed by one or more computers or other devices. Generally, program modules include routines, programs, objects, components, data structures, etc. for performing particular tasks or implementing particular abstract data types. These program modules and the like may be executed as native code or may be downloaded and executed, such as in a virtual machine or other just-in-time compilation execution environment. Typically, the functionality of the program modules may be combined or distributed as desired in various embodiments. An implementation of these modules and techniques may be stored on some form of computer-readable storage media.

The example architectures and computing devices shown in FIGS. 1-4 are provided by way of example only. Numerous other operating environments, system architectures, and device configurations are possible. Accordingly, embodiments of the present disclosure should not be construed as being limited to any particular operating environment, system architecture, or device configuration.

Illustrative Processes

Figure 5:
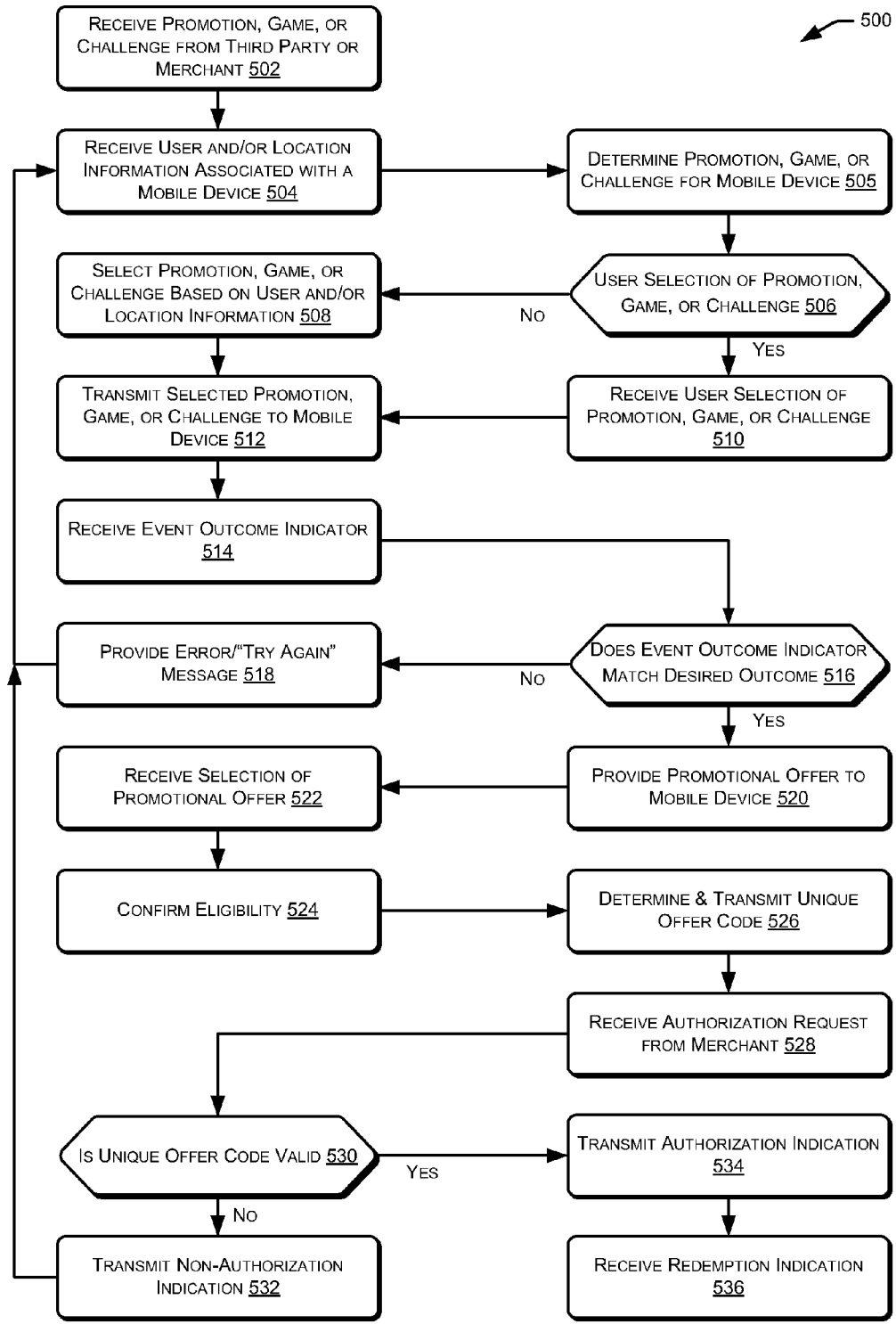
FIG. 5 illustrates an example flow diagram of an embodiment of a process for providing games, challenges, and/or promotional content associated with the merchant to a mobile device, according to an example implementation.

FIG. 5 is a flow diagram showing process 500 for providing games, challenges, and/or promotions to mobile devices. This process is illustrated as a logical flow graph, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process.

The process 500 includes receiving a promotion, a game and/or a challenge from a merchant or a third-party vendor at 502. In one aspect, the promotion, game, and/or challenge may be provided by the merchant or third-party vendor by filling out a form and/or creating the game and/or challenge using a web-based, menu-driven program or application, provided by the service provider computer 110. At 504, the process 500 may receive user and/or location information associated with a mobile device, such as but not limited to one or more of the mobile devices 104 shown in FIG. 1. The process 500 may then determine a promotion, a game, or a challenge for the mobile device 104 based at least in part on received user and/or location information at 505. At 506, the process 500 may then determine whether a user 102 of the mobile device 104 has selected a promotion, game, or challenge. For example, a list of promotions, games, and/or challenges may have been presented to the user 102 based on the received location and/or user information after 505. If the user 102 has not selected a promotion, game, or challenge at 506, the process 500 may select a promotion, a game, or a challenge for the user 102 at 508 based on the user and/or location information received. However, if the user 102 has selected a promotion, game, or challenge at 506, the process 500 may instead receive the user selection of the promotion, game, or challenge at 510.

The process 500 may then transmit the selected promotion, game, or challenge to the mobile device at 512. As noted above, the promotion, game, or challenge may be selected by the service provider computer 110 or by the user 102. The process 500 may then receive an event outcome indicator from the mobile device at 514. In some instances, the event outcome indicator may be the answer provided by a user. However, in other instances, the event outcome indicator may indicate that the answer was correct, that the challenge was completed, or that the game was won. The process may then determine whether the event outcome indicator matches a desired outcome at 516. This may include comparing the answer provided by the user 102 to the answer provided by the merchant computer 112 or the third-party computer 116.

In some instances, if the process 500 determines that the event outcome indicator does not match the desired outcome at 516, then the process may provide an error/"try again" message at 518 and return to receiving user and/or location information associated with the mobile device 104 at 504. Alternatively, if the process 500 determines at 516 that the event outcome indicator matches the desired outcome, the process 500 may provide a promotional offer to the mobile device 102 at 520. The process 500 may then receive a selection of a promotional offer at 522. For example, a user 102 may be presented with multiple promotional offers based on completing the challenge and/or winning the game. At 524, the process 500 may then confirm eligibility of the selected promotion and/or eligibility of the user 102. Assuming the process 500 has affirmatively confirmed eligibility at 524, the process 500 may then determine and transmit a unique offer code at 526, such as but not limited to a unique ID from the unique ID datastore 150. Alternatively, in some instances, the process 500 may proceed directly to determining and transmitting the unique offer code at 526 upon determining that the event outcome indicator matches the desired outcome at 516.

At 528, the process 500 may receive an authorization request from a merchant computer 112 or POS device 114.

In some instances, this authorization request is in response to the user 102 presenting the unique ID at the merchant's store. The process 500 may then determine whether the unique offer code, or ID, is valid at 530. Determining whether the unique ID is valid may include comparing the unique ID against a look-up table containing each previously assigned unique ID. If the unique ID is not validated at 530, the process 500 may transmit a non-authorization indication to the mobile device 104 at 532 and then proceed to receive user and/or location information once again at 504. On the other hand, if the unique ID is validated at 530, the process may transmit an authorization indication to the mobile device 104 at 534. The process 500 may then complete by receiving a redemption indication at 536. In some instances, the redemption indication may be received from the merchant computer 112 or the third-party computer 116 to indicate that the user 102 has redeemed the promotion or coupon. This may "unlock" the next game and/or challenge. Additionally, this may provide an indication that the redeemed promotion or coupon is no longer valid.

Illustrative methods and systems for providing games, challenges, and/or promotions to mobile devices are described above. Some or all of these systems and methods may, but need not, be implemented at least partially by architectures such as those shown in FIGS. 1-4 above.

CONCLUSION

Although embodiments have been described in language specific to structural features and/or methodological acts, it is to be understood that the disclosure is not necessarily limited to the specific features or acts described. Rather, the specific features and acts are disclosed as illustrative forms of implementing the embodiments.

That which is claimed:

1. A system, comprising:
   at least one memory that stores computer-executable instructions;
   at least one processor configured to access the at least one memory, wherein the at least one processor is configured to execute the computer-executable instructions to:
   receive location information associated with a mobile device, wherein the location information associated with the mobile device comprises a global positioning service (GPS) location indicator;
   receive additional information associated with the mobile device;
   select content based at least in part on the location information and the additional information, the selected content comprising one or more first conditions to be met for receiving first promotional offer;
   transmit, to the mobile device, the selected content;
   receive, from the mobile device, an event outcome indicator associated with the selected content;
   transmit a first promotional offer to the mobile device, the first promotional offer based at least in part on the event outcome indicator;
   receive, from a point of sale (POS) device, an indication that the first promotional offer transmitted to the mobile device and associated with the selected content was redeemed; and
   in response to receiving the indication, unlock at least a portion of the one or more first conditions, the at least a portion of the one or more first conditions comprising one or more second conditions to be met for receiving one or more second promotional offers, wherein the unlocking is based at least in part on one or more merchants and comprises:
   selecting a second condition of the one or more second conditions based at least in part on a comparison of a first award amount associated with the first promotional offer to a second award amount associated with a second promotional offer of the one or more second promotional offers, the second promotional offer to be received after the second condition is met.

2. The system of claim 1, wherein the additional information comprises purchasing behavior information or demographic information.

3. The system of claim 2, wherein the demographic information comprises at least one of a name, an address, average income, a sex, or a race associated with a user of the mobile device.

4. The system of claim 1, wherein the content comprises a promotion, a game, or a challenge configured to be played at least in part with the mobile device.

5. The system of claim 1, wherein the content is based at least in part on at least two of a location of a merchant, purchasing behavior information associated with a user of the mobile device, or demographic information associated with a user of the mobile device.

6. The system of claim 1, wherein the content is based at least in part on at least two of a location of the mobile device, purchasing behavior information associated with a user of the mobile device, demographic information, or enhanced demographic information associated with a user of the mobile device.

7. The system of claim 1, wherein the event outcome indicator comprises an indication that the mobile device has at least one of received an award as a result of a game, correctly answered a question, or completed a predefined task.

8. The system of claim 7, wherein the at least one of the game, the question, or the predefined task are received, by the at least one processor, from a third-party or a merchant.

9. The system of claim 1, wherein the first promotional offer comprises a discount available through a third-party or at a merchant.

10. The system of claim 1, wherein the at least one processor is further configured to execute the computer-executable instructions to:
    receive a selection of the first promotional offer from the mobile device;
    confirm eligibility of the mobile device;
    determine a unique offer code for the mobile device associated with the first promotional offer when the mobile device eligibility is confirmed; and
    transmit the unique offer code to the mobile device.

11. The system of claim 10, wherein the at least one processor is further configured to execute the computer-executable instructions to:
    receive an authorization request from a third-party or a merchant indicating that the unique offer code was presented to the third-party or the merchant;
    transmit, to the third-party or the merchant, an authorization indication when the unique offer code is valid, otherwise, transmit a non-authorization indication; and
    receive, from the third-party or the merchant, a redemption indication when the unique offer code has been redeemed.

* * * * *